Figure 1:
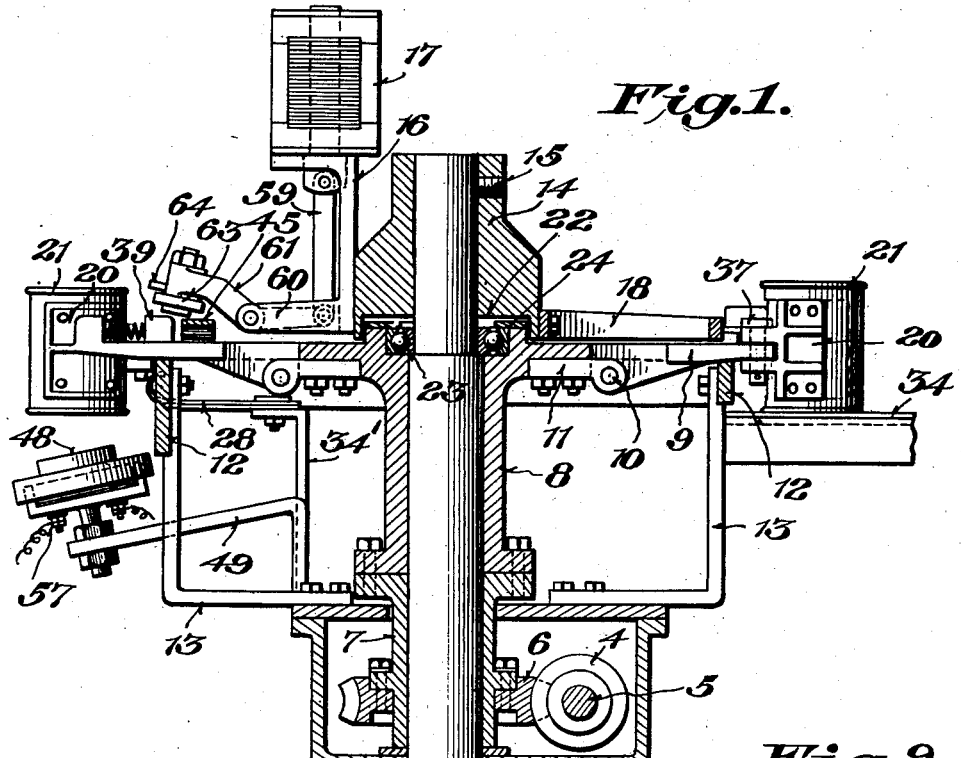

March 29, 1938. R. O. HENSZEY ET AL 2,112,621
PROCESS OF AND APPARATUS FOR DETECTING SOLDER PELLETS IN CANS
Filed June 19, 1936 4 Sheets-Sheet 1

Inventors
Roy O. Henszey, Hans Buehler, Paul Smart,
By C. P. Goepel
Attorney

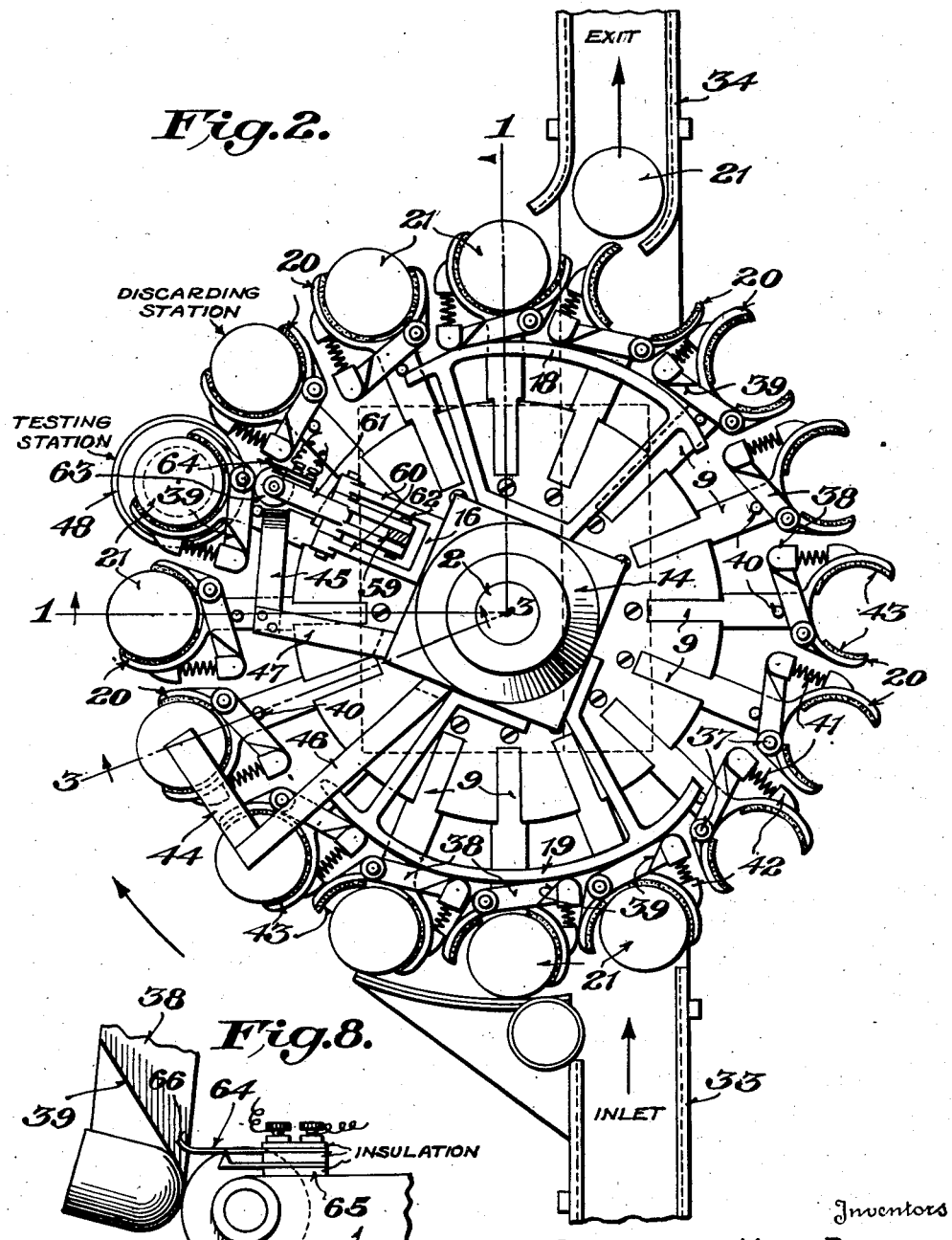

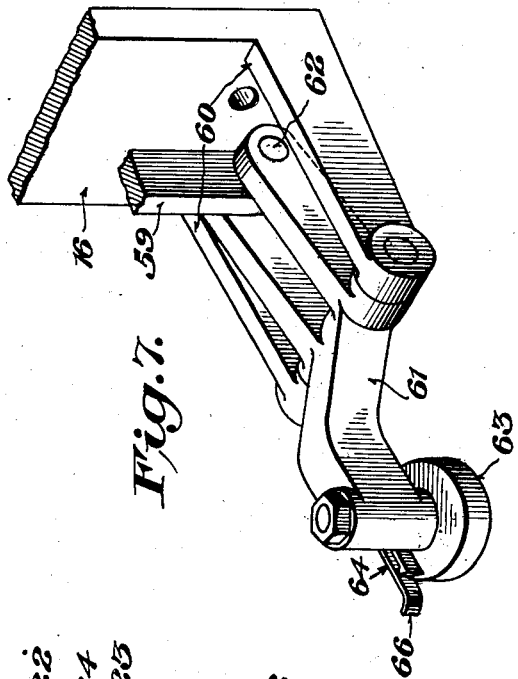
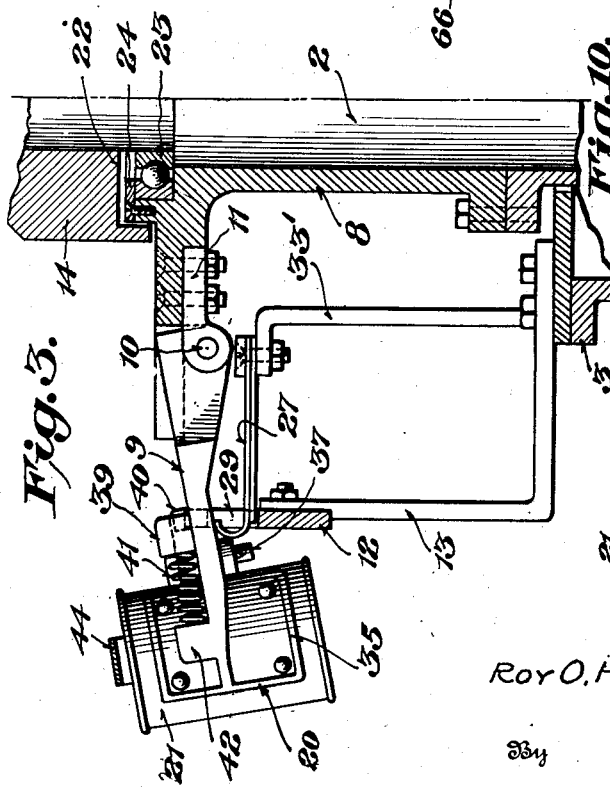
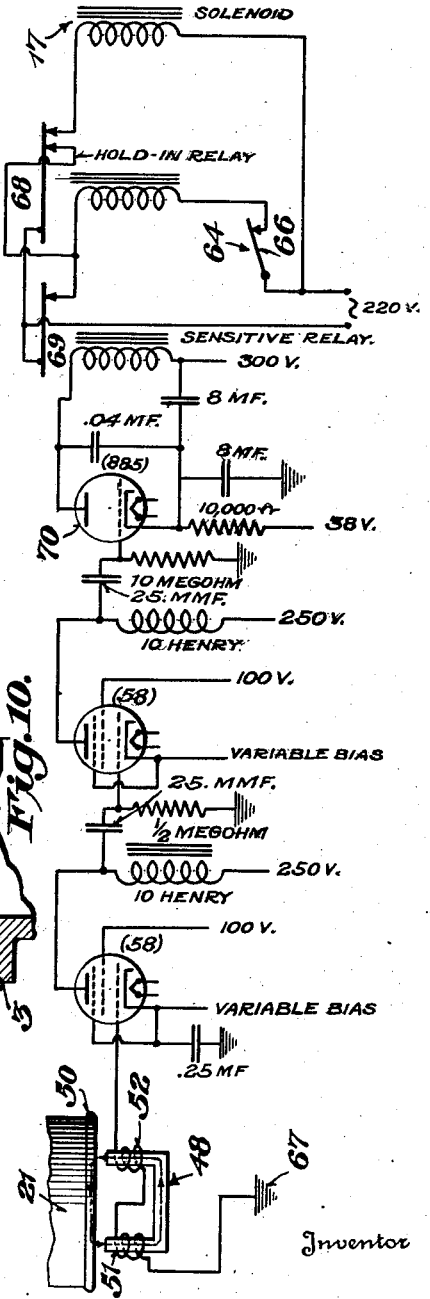

March 29, 1938. R. O. HENSZEY ET AL 2,112,621
PROCESS OF AND APPARATUS FOR DETECTING SOLDER PELLETS IN CANS
Filed June 19, 1936   4 Sheets—Sheet 4

Inventors
Roy O. Henszey, Hans Buehler,
Paul Smart,
By C. P. Goepel
Attorney

Patented Mar. 29, 1938

2,112,621

UNITED STATES PATENT OFFICE 2,112,621

PROCESS OF AND APPARATUS FOR DETECTING SOLDER PELLETS IN CANS

Roy O. Henszey, Hans Buehler, and Paul Smart, Oconomowoc, Wis., assignors to Carnation Company, Oconomowoc, Wis., a corporation of Delaware Application June 19, 1936, Serial No. 86,212

15 Claims. (Cl. 73—51)

Our invention relates to process of and apparatus for detecting solder pellets in cans. The process of our invention comprises bringing a can into close proximity to a vibration sensitive detector, moving the can in such manner that any pellet contained therein is caused to strike the can wall thereby producing a vibration of said can wall capable of being detected, said vibration sensitive detector with its associated apparatus being responsive to the vibration produced by said pellet but being relatively insensitive to extraneous vibrations, then transmitting the response of said detector, usually after amplification, to means for indicating the presence of any pellet in said can and, if desired, transmitting said response to means for automatically rejecting any pellet-containing cans. The apparatus of our invention comprises a vibration sensitive receiver or detector, means for conveying a plurality of cans some of which contain solder pellets seriatim in close proximity to said vibration sensitive detector, means for setting said cans into forced vibration while in close proximity to said detector, said forced vibration being capable of causing any pellets to vibrate against the walls of said cans thereby producing a vibration different from said forced vibration, said detector and associated apparatus being responsive to said different vibration but relatively insensitive to said forced vibration, and means for transforming any response of said detector to said different vibration into mechanical action capable of indicating the presence of any pellet and, if desired, automatically rejecting any cans containing pellets; all as more fully hereinafter set forth and as claimed.

In the canning of evaporated milk and other liquids it is common to employ the so-called "vent-hole can". This can, after being filled, is sealed by placing a drop of solder in the vent-hole and allowing it to harden there. It is difficult to prevent the solder from dropping through the vent-hole into the can and this method invariably results in the inclusion of solder pellets in at least a small proportion of the cans. The presence of these pellets in cans containing foodstuffs is highly objectionable. The present invention comprises an automatic method for detecting and discarding cans containing such pellets.

It has formerly been the practice to detect pellets in cans by shaking the sealed cans close to the ear and listening for the slight click or noise produced by the pellet striking the wall of the can. This hand process is, of course, expensive and highly unreliable. Invariably a certain proportion of cans are passed by the inspectors, which contain pellets. Owing to the high viscosity of many food products, such as evaporated milk, and the resulting sluggish movement of any pellets, there is a definite lower limit of pellet size which can be detected by the hand method. It is impossible to detect the smaller sized pellets and these, if anything, are more objectionable than the larger ones.

The present invention makes it possible to detect pellets which are the size of pin points and which make so little noise when the can is shaken that any noise produced thereby is inaudible to the human ear. Our method can be made completely automatic or may be operated to produce a visual indication of the presence of pellets with manual removal of the cans containing such pellets. The method can be operated with great speed and precision.

Broadly speaking our method comprises vibrating a can in such fashion that any pellet contained therein is caused to strike a wall of the can thereby producing a vibration or noise which is capable of being detected automatically. This vibration or noise is detected by a receiving means which is advantageously tuned in such manner that it is sensitive to the vibration produced by the pellets striking the can wall but is relatively insensitive to extraneous noises, such as the splashing of the milk and the vibration which is applied to the can. The impulse which is received is then amplified, usually electrically, and this amplified impulse is employed to produce a visual indication of the presence of any pellets or to set in motion mechanical elements which are capable of automatically discarding any cans which contain pellets. The vibration applied to the can is usually a simple shaking produced by a quick dropping of the can and the receiver may be any noise or vibration sensitive device such as a telephone receiver, microphone or the like. We have found it particularly advantageous to vibrate the can while in a magnetic field and in such a position that a magnetic flux passes through the can wall, the variations in flux produced by the pellet vibration being then detected by the corresponding variations in an electric current induced thereby.

Figures 9, 11:
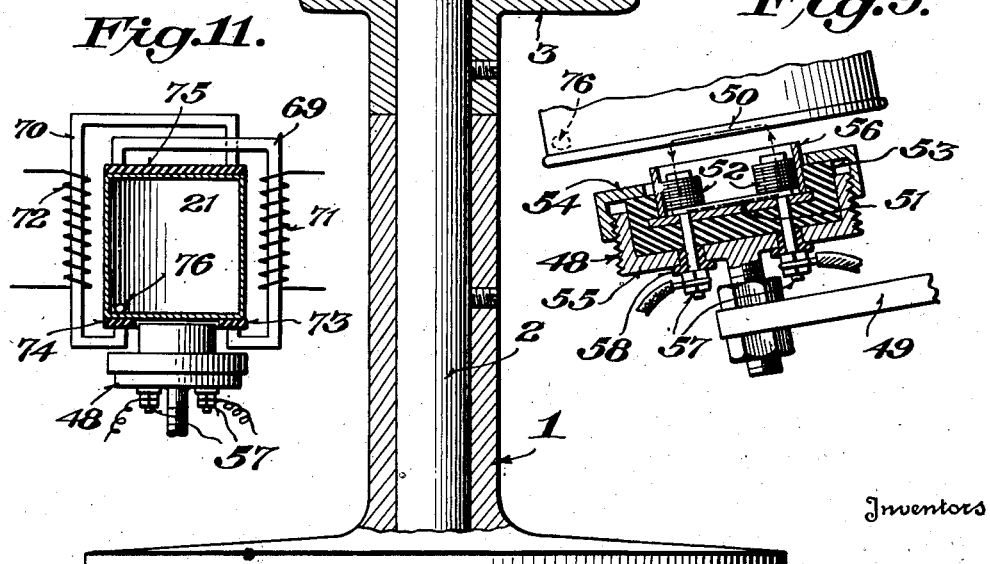
Figure 4:
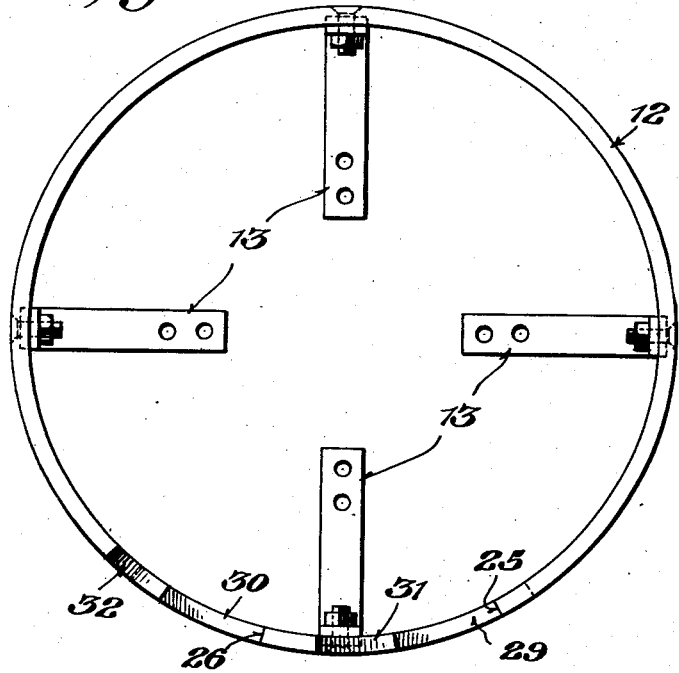
Figure 5:
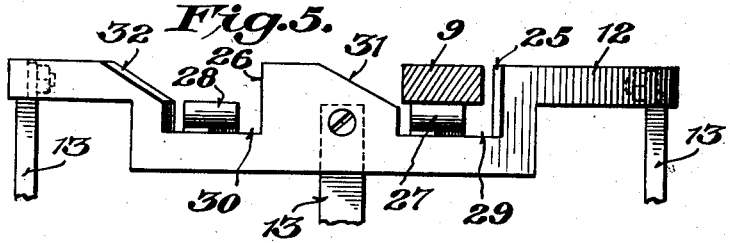
Figure 6:
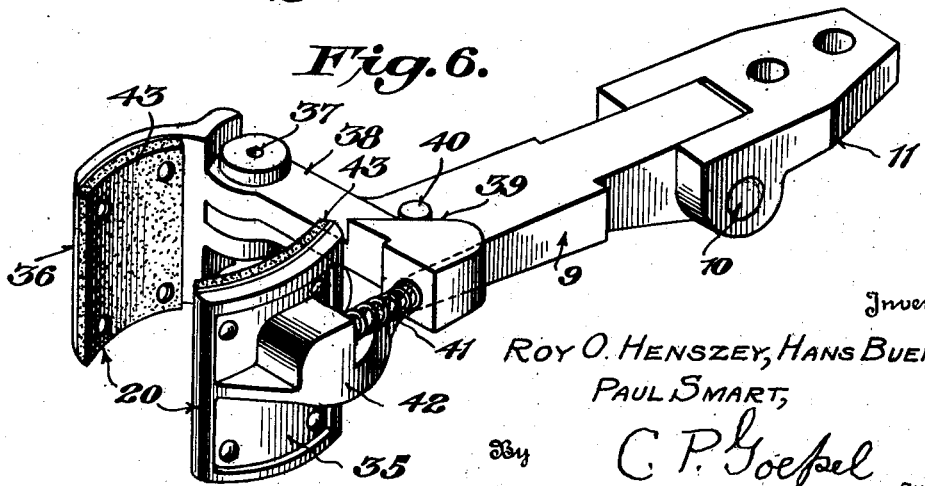

Our invention can be explained more specifically by reference to the accompanying drawings which show an assembly of apparatus elements within the purview of our invention and susceptible of use in our process. In this showing:

Fig. 1 is a vertical section through a machine capable of operating automatically to discard cans containing pellets, the section being taken along the line 1—1 of Fig. 2, Fig. 2 is a plan view of the machine with certain parts removed, Fig. 3 is a vertical section through the machine along the line 3—3 of Fig. 2, Fig. 4 is a plan view of the cam which assists in producing vibration of the cans, Fig. 5 is a side elevation of the cam of Fig. 4, Fig. 6 is a perspective view of the hinged carrier arms which support the cans before and after testing, Fig. 7 is a perspective view of the mechanism attached to a solenoid which, when operated, serves to automatically discard cans containing pellets, Fig. 8 is a view of a switch which re-sets the solenoid mechanism after the discarding of a can, Fig. 9 is an enlarged sectional view of the vibration detector, with parts in elevation, Fig. 10 is a diagram of electrical connections which can be employed for detecting and amplifying the impulse received by the detector and for operating the solenoid as a result of said impulse, while Fig. 11 shows a modified method of vibrating the cans as they are being tested.

In the various figures, like parts are represented by like reference numerals. Our machine is mounted on a pedestal base 1 which supports a fixed vertical shaft 2. A gear housing 3 is supported by the vertical shaft and this provides a mounting for a motor, not shown, and driving worm 4, mounted on the motor shaft 5. The worm gear 4 meshes with a gear 6 which is secured to a sleeve 7 journaled on shaft 2. A turret 8 is bolted to sleeve 7 and journaled on shaft 2, this turret serving to support and rotate a series of carrier arms 9 (see Fig. 6) which are pivoted at 10 to brackets 11 bolted to said turret. The carrier arms bear upon the fixed annular cam 12 which is supported by brackets 13 mounted on gear housing 3; see Figs. 1, 4 and 5.

The top of the vertical shaft 2 is reduced in diameter and a fixed cap 14 is secured to this by means of set screw 15. This cap is provided with flat sides to which are secured bracket 16, which supports the solenoid 17, and two cams 18 and 19 (see Figs. 1 and 2) which serve to operate the claw grip 20 which holds and carries the cans 21. The cap 14 is provided with a counter bore 22 at its lower end which provides room for the ball bearing race 23 which is secured to the turret 8 by means of the clamp ring 24.

As shown in Fig. 5, the cam 12 is provided with two vertical sections 25 and 26 forming one side of pockets 29 and 30. As the carrier arms 9 pass along the cam from right to left in Fig. 5 a sharp drop is produced at these two points. The arms strike the springs 27 and 28, the ends of which are positioned in pockets 29 and 30, respectively, (see Figs. 3 and 5) and the cans which are held by these arms thus receive a sudden jolt or vibration at these two points. The first drop serves to accurately position any pellets 76 in the cans while the second drop causes the pellet to strike the can wall thereby producing a vibration or noise which is detected in a manner to be described. The springs 27 and 28 are mounted on brackets 33' and 34', respectively which in turn are secured to the gear housing 3.

Referring to Fig. 2, the cans to be tested are fed to the machine by means of conveyor 33 and removed by conveyor 34. The cans are automatically gripped at conveyor 33 by the claw grips 20 and are automatically released at conveyor 34. The claw grips are formed in two parts (see Fig. 6) one may be termed the hand part 35 being integral with the carrier arm 9 while the other finger part 36 is pivoted at 37 to the carrier arm. The pivoted part 36 is provided with a finger 38 having at its end a tapered raised cam portion 39 with a beveled edge. The fingers 38 serve as cam followers, cooperating with cams 18 and 19 to operate the claw grips, as shown in Fig. 2. The carrier arms 9 are provided with bosses 40 which act as a stop for fingers 38. These fingers are normally held in closed or gripping position by means of springs 41 which tend to press the fingers 38 against the bosses 40, as will be clear from Fig. 6. The springs 41 are supported by and act between raised portions 42 on hand part 35 and raised portions 39 on fingers 38. The inner faces of the claw grips are provided with rubber linings 43 which provide a positive gripping action and reduce the severity of extraneous vibration carried to the can through the claw grip.

It is generally advantageous to provide means whereby the carrier arms are forced to drop off the cam portions 25 and 26 with a velocity higher than that produced by gravity alone. The pellets tend to fall at the rate which would be produced by gravity and thus become spaced from the can wall. When the downward motion of the can is then suddenly arrested by the springs 27 and 28, any pellet is caused to strike the can wall sharply. This forced dropping of the cans may be produced by the springs 44 and 45; see Fig. 2. These springs are mounted on cap 14 by means of arms 46 and 47, respectively. Spring 44 normally bears on the top of the cans, as shown in Fig. 3 while spring 45 bears on the carrier arms 9, as shown in Fig. 1.

The detector, indicated generally at 48 in Figs. 1 and 9, is adjustably mounted on arm 49, which is secured to housing 3 at the testing station immediately below the second drop produced by cam section 26. The detector is adjusted in height so that the cans, at the lowest point of their second drop, are immediately above the detector, as shown in Fig. 9.

We have found it advantageous to employ a detector very similar to the ordinary telephone receiver. We have found, however, that greater sensitivity and selectivity are secured provided the soft iron disc found in the usual telephone receiver is removed. The can bottom 50 then takes the place of this soft iron disc and variations in the distance of the can bottom from the permanent magnet 51 (Fig. 9) produce corresponding variations in magnetic flux which in turn induce currents in the magnet coils 52. The path of the flux through the can bottom is indicated by dotted lines and arrows in Figs. 9 and 10.

The detector shown in Fig. 9 is insensitive to noises at all times when the can bottom is removed from its immediate vicinity. Moreover the can bottom itself is relatively insensitive to extraneous noises originating outside the can. But the bouncing of a pellet on the can bottom directly vibrates the same and this vibration is directly transformed into the desired electrical impulse. This avoids the loss of energy which would result from the indirect method of producing sound waves in the air, followed by reception of these sound waves and transformation to electrical energy.

The permanent magnet 51 and coils 52, with their surrounding metal case 56, are mounted in a rubber packing 53, this packing being secured between the two metal halves 54 and 55, shown in Fig. 9. Electrical connection to coils 52 are made by means of binding posts 57 which pass through insulating bushings 58, as will be clear from the showing of Fig. 9.

We have also illustrated in the drawing a means for automatically discarding cans containing pellets, this means being operated by an electrical receiving and controlling means, the wiring diagram of which is shown in Fig. 10. The discarding means comprises the solenoid 17 (Fig. 1) with connecting rod 59, pivoted to its plunger. The solenoid bracket 16 is provided with horizontal arms 60 (see Fig. 7) in the ends of which is pivoted a bifurcated rocker arm 61 which is pivoted at one end 62 to connecting rod 59. A cam roller 63 is secured to the other end of rocker arm 61 in the manner shown in Fig. 7. It will be evident from this showing that, when connecting rod 59 is raised by actuation of the solenoid, the cam roller 63 will be lowered. In its normal position, shown in Fig. 1, the cam roller 63 is raised above part 39 of the fingers 38 of claw grip 20. But when the solenoid is actuated the disc drops into the path of the claw fingers and operates to open the claw grips as the carrier arms move past; see Fig. 2.

The electric switch, indicated generally at 64 (see Figs. 2, 8 and 10) is mounted on a block of insulation 65 on the end of rocker arm 61. This spring, as will be evident from Fig. 8, is normally held in closed position by the spring action of the upper leaf 66 but is opened, after excitation of the solenoid, by the cam portions 39 on fingers 38 of claw grips 20, after the cams have left the testing station. This switch 64 has the purpose of restoring the solenoid to its normal or inoperative position after the discarding of a can containing a pellet, as will be described later.

The wiring diagram of a suitable receiver and controller for operating our device is shown in Fig. 10. At the left in this figure is shown the detector 48 with wiring connections to the coils 52, one end being grounded at 67. The wiring connections are believed to be clear from the legends in Fig. 10.

Many suitable wiring diagrams for our receiver can be developed. It is only necessary that the receiver amplify the impulse received from the detector and employ this amplified impulse to operate the hold-in relay 68. A sensitive relay 69 is usually employed, this being operated by the current from a gas filled tube 70 which acts as an electronic trip. This trip 70 is generally connected in the circuit after one or more stages of amplification, as shown in Fig. 10. We have found that an electronic trip is superior to an electro-mechanical trip, because the voltage of tripping may be adjusted and is then constant, and because the trip is caused by instantaneous peak voltage rather than by some function of voltage and time. This is particularly important in the present invention since the pellet sound is extremely short in duration owing to the damping action of the milk. Interfering noises are usually more sustained in length.

When the electronic trip 70 is operated it energizes the sensitive relay 69 which in turn operates hold-in relay 68. This relay energizes the solenoid 17 (see also Fig. 1) and the solenoid remains energized until electric circuit of relay 68 is broken by opening of switch 64. As described previously, energization of solenoid 17 causes the cam roller 63 to drop in position to operate fingers 38 on claw grips 20. This causes the claw grips to release the cans and the cans drop by gravity and are thereafter discarded. It is, of course, evident from the preceding description that the solenoid 17 is caused to operate only when the can at the testing station contains a pellet. The switch 64 which is mounted on rocker arm 61 drops down in the path of cam portions 39 of fingers 38 only when a pellet has been detected. And as soon as the switch 64 has been opened the solenoid is restored to its inoperative position and the rocker arm 61 lifts the switch 64 out of the path of the cam portions 39.

After the electronic trip is energized by the electrical impulse produced upon the detection of a pellet in a can, it automatically restores itself to zero current due to the voltage drop in its cathode resistor when it is tripped. Thus the rejecting apparatus shown in the drawing is fully automatic. We may use other methods also.

The description of the operation of our pellet testing and can discarding device may be summarized as follows: A series of cans are fed into the machine by means of conveyor 33. At this point, during the rotation of the turret or turn table 8, the claw grips 20 are opened by operation of cam 19. These claw grips grasp the individual cans and carry them clockwise around the turntable, as indicated by the arrow in Fig. 2. Along the section line 3—3 of Fig. 2 the pivoted carrier arms 9, which are supported by cam 12 (see Fig. 5) drop into pocket 29 and the cans are given a sudden jolt and are tilted slightly. This jolt serves to loosen any pellet 76 and to tumble it into the lowest point of the can, thereby definitely localizing its position. The carrier arms are then raised by the beveled portion 31 of cam 12. As the cans reach the testing station directly above the detector 48 (see Fig. 2), the carrier arms drop into pocket 30 of cam 12 (see Fig. 5) and strike the spring 28. The cans, at their lowest position, almost touch the detector 48 and any pellets contained therein are caused to strike the bottom of the cans while the cans are in this position.

If a pellet is present in the can being tested, this pellet is caused to strike the can wall producing a vibration in the can bottom which causes a variation in the flux through the permanent magnet 51 and a corresponding electrical impulse in coils 52. This electrical impulse is amplified by the vacuum tubes shown in Fig. 10 sufficiently to actuate the relay 69. Relay 69 in turn actuates the hold-in relay 68, which upon closure, energizes the solenoid 17. Operation of the solenoid raises the connecting link 59 causing the cam disc 63 to drop into a position to contact part 39, the cam portion of finger 38 on claw grip 20. And, as the rotation of the turret carries the pellet-containing can past the cam disc 63, the claw is opened and the can drops by gravity or it may be pushed from the claw. The can is thus automatically discarded at the discarding station. Soon after this operation the switch 64 (Fig. 8) is opened. This breaks the circuit of the hold-in relay 68 which opens thereby breaking the electrical circuit to the solenoid 17. The connecting link 59 drops and the cam roller 63 and switch 64 are raised to their normal or inoperative position just before the next succeeding can reaches the testing station.

If the tested can does not contain a pellet the sudden drop of the can at the testing station produces only those electrical impulses in the detector coils towards which the receiver and associated apparatus is relatively insensitive. The relay 69 is not operated and the solenoid 17, cam disc 63 and switch 64 remain in their inoperative positions. The pellet-free can is therefore carried past the discarding station and is finally released from the claw grip 20 by operation of cam 18. The can then leaves the machine by means of the conveyor 34.

By means of the machine described and illustrated we have found it possible to test cans at the rate of up to 135 per minute. Pellets as small as pin points have been detected. Both of these results were impossible prior to the present invention.

While we have described what we consider to be an excellent and practical embodiment of our invention it is immediately obvious that many modifications can be made within the skill of the art which fall within the purview of our invention. Our method depends upon the application of a forced vibration to the cans to be tested, this vibration being of a type causing the pellet to bounce and to strike the can wall, thus producing a vibration in said wall which is capable of being detected and differentiated from the forced vibration. The pellet-produced vibration or the resultant vibration of the can wall may differ from the forced vibration by a difference in pitch, a difference in quality or a difference in amplitude; the only requisite being that this difference is capable of being detected.

With the apparatus shown in our drawings in which the pellet impact is caused by sudden arresting of the downward motion of the can, the frequency of the vibration caused by the pellet impact is a rather high audio frequency. The extraneous vibration caused by such things as the splashing of the contents of the can, the operation of the machine, floor vibrations, and sound waves, are sufficiently lower in frequency to be adequately eliminated from the amplifier output by selective amplification.

In Fig. 11 there is shown an optional method of causing vibration of the cans for testing purposes. In this showing the can 21 is given a chattering motion by means of two electromagnets 69 and 70 energized by two separate coils 71 and 72, respectively. The electric circuits of coils 71 and 72 may be such that the current in one circuit lags behind that in the other by about half a cycle. In this case the electromagnets will be energized alternately and a chattering motion of can 21 will be produced. It is desirable to have the cans rest upon rubber strips 73 and 74 and a rubber pad 75 may be employed at the top to prevent actual contact of the can with the iron magnets. The detector 48 employed in this embodiment may be of the same type as that shown in the other figures.

The method of detecting the difference in vibration of the can bottom caused by the presence of a pellet may, of course, vary widely. It is possible to detect this difference mechanically or electrically or by a combination of these methods. When the difference is detected electrically it is immediately evident that a wide selection of detecting and amplifying methods are available. That illustrated in the drawings is only one of many.

It is possible, of course, to replace relay 69 in Fig. 10 by any of the usual indicating devices. In this case our method may be manual in so far as the discarding of the pellet-containing cans is concerned while being electrical and mechanical in so far as detection of the pellets is concerned.

It is also possible to mark the cans containing pellets in various ways.

As has been indicated previously, a conventional microphone may be employed as a detector in our invention and the pulsating microcurrent resulting from the noise produced by the pellet can be amplified by means familiar in the radio art. The amplified current can be employed in such manner that in effect the noise of the bounding pellet is merely amplified. It is also possible to employ the principle of the so-called condenser microphone in making a detector.

The amplifier shown is sensitive to high audio frequencies while being relatively insensitive to low frequencies, this being accomplished by choice of constants in the coupling circuits of the amplifier. The same result can be accomplished, of course, by other well-known methods. Resonant circuits may be used with or without a beat frequency oscillator.

The tube 70 in Fig. 10 is so connected that it carries a heavy current for a short time after any peak signal voltage higher than a fixed value is applied to its grid. Relay 69 is operated by this tube. Tube 70 and relay 69 may also represent devices which are designed to operate at a certain value of a function of voltage and duration of voltage.

In a modification of this invention relay 69 may represent a time lag relay which operates to energize the solenoid 17 for a definite short time interval, this interval corresponding to the time required for a can to traverse the distance from the testing station to the discarding station.

The present invention is applicable to problems other than that of detecting solder pellets in tin cans. It is generally applicable for the detection of solid bodies in containers holding fluids provided the said solid bodies are of different specific gravity than the said fluids and the material of the container is such that a vibration capable of being detected is produced upon the striking of the container walls with said solid bodies. Cardboard and wooden containers are examples of containers which are within the present invention.

Other commercial applications and methods of operating the process of the present invention, which fall within the scope of the following claims, will immediately occur to those skilled in the art.

What we claim is:

1. An apparatus for detecting the presence of solid bodies in containers holding fluids, comprising a vibration sensitive detector, means for continuously moving a container past and into close proximity to said detector, means for moving said container bodily while in such position in such manner as to cause any solid body contained therein to strike a wall of said container thereby producing a vibration of said wall, and means for converting the resulting response of said detector into mechanical action to indicate the presence of any such solid body.

2. An apparatus for detecting the presence of solid bodies in containers holding fluids, comprising a vibration sensitive detector, means for continuously moving a container past and into close proximity to said detector, means for applying a forced vibration to said container while in such proximity of such type that any solid body therein is caused to strike a wall of said container thereby producing a resultant vibration different from said forced vibration, said detector being sensitive to said different vibration but relatively insensitive to said forced vibration, and means for transforming any response to said detector into mechanical action capable of indicating the presence of any solid body in said container.

3. An apparatus for detecting solder pellets in cans containing fluids, which comprises a vibration sensitive detector, means for continuously passing a plurality of cans seriatim in a path leading in close proximity to a said vibration sensitive detector, means for applying a forced vibration to said cans while within the field of and while moving past said detector, said vibration being of a type causing any pellets contained in said cans to strike the walls of said cans thereby producing a vibration differing from said forced vibration, means for selectively amplifying the response to said detector to said different vibration and means for converting said amplified response into mechanical action capable of designating any cans containing pellets.

4. An apparatus for detecting solder pellets in cans, which comprises a vibration sensitive detector, means for moving a series of cans along a predetermined path intersecting the field of said detector, means for applying a forced vibration to said cans while in the field of said detector, said vibration being of sufficient intensity to cause any pellets in said cans to strike the can walls, means for amplifying any high audio frequency response of said detector and means for employing said amplified response for actuating means for removing any pellet-containing cans from said predetermined path.

5. An apparatus for detecting solder pellets in metal cans, which comprises means for moving a plurality of cans seriatim along a path, means for applying a forced vibration to said cans at a predetermined point in said path, said vibration being of sufficient intensity to cause any pellets contained in said cans to strike the walls of said cans thereby producing a vibration different from said forced vibration, means for passing a magnetic flux through the walls of said cans when at said predetermined point, means for transforming variations in said magnetic flux produced by said different vibration into an electric current, means for amplifying said electric current and means actuated by said electric current for removing any pellet-containing cans from said path.

6. An apparatus for detecting solder pellets in cans which comprises a vibration sensitive detector, means for passing a plurality of cans along a predetermined path seriatim, said path entering the field of said detector, means for causing said cans to drop abruptly and for suddenly arresting said drop while said cans are within said field, thereby causing any pellets in said cans to strike the can walls, means for amplifying any response of said detector to the vibration resulting from the striking of said can walls and for converting said amplified response into mechanical action capable of designating any cans which contain pellets.

7. An apparatus for detecting solder pellets in cans, which comprises a plurality of grippers, means for moving said grippers in a closed path, means for presenting a series of cans to said grippers at a point in said closed path, means for operating said grippers to receive said cans at said point, means for producing a vibration of the gripped cans in such fashion as to cause any pellets contained therein to strike the can walls, means for picking up the resulting vibration of said can walls and for designating which cans contain pellets, and means for releasing the cans from the grippers before the grippers reach said point at which they are operated to receive cans.

8. In the process of detecting solid bodies in containers, the steps which comprise passing a container along a predetermined path, passing in proximity to a vibration sensitive detector, tipping and shaking said container at one point in said path in order to definitely position any solid bodies in said container, then vibrating said container while in motion along said path in such manner that any so positioned solid bodies are caused to strike the wall of said container while in immediate proximity to said detector, said detector being responsive to said vibration, and converting any response of said detector into mechanical action adapted to indicate the presence of any such solid bodies.

9. An apparatus for detecting the presence of solid bodies in containers, comprising a detector, means for positioning a container in close proximity to said detector and for moving said container in such manner that any solid body contained therein is caused to strike a wall of said container while within proximity to said detector, thereby producing a vibration of said container wall, means for selectively amplifying any high audio frequency component of said vibration picked up by said detector and means actuated in response to said amplified vibration for indicating the presence of any solid body in said container.

10. An apparatus for detecting the presence of solid bodies in metal containers, comprising electrical means for producing a magnetic flux, means for positioning such a container in such proximity to said electrical means that said magnetic flux will pass through a wall of said container, means for vibrating the so-positioned container in such fashion that any solid body contained therein is caused to strike said wall thereby producing a vibration of said wall, and means responsive to the resulting variations in said magnetic flux for indicating the presence of any solid bodies in said container.

11. An apparatus for detecting the presence of solid bodies in containers, comprising means for continuously moving a container at a substantially constant velocity along a predetermined path, means for vibrating said container at a predetermined point in said path without substantially disturbing said continuous motion along said path, said vibration being in a direction substantially at right angles to the direction of said continuous motion and being capable of causing any solid body in said container to strike a container wall thereby producing a resultant vibration different from the vibration produced in the absence of a solid body, a detector for picking up any such resultant vibration and means for converting any response of said detector to said resultant vibration into mechanical action capable of indicating the presence of any solid body in said container.

12. An apparatus for detecting the presence of solid bodies in containers, comprising a vibration-sensitive detector, means for passing a plurality of containers seriatim along a predetermined path passing in close proximity to said detector, means for suddenly vibrating said containers while in motion along said path and while in proximity to said detector, said vibration being capable of causing any solid bodies in said containers to strike the walls of said containers thereby producing a resultant vibration of said walls, means for amplifying any responses of said detector to said resultant vibration and means actuated by said amplified response for indicating the presence of any solid bodies in any of said containers.

13. The apparatus of claim 12 wherein said means for suddenly vibrating said containers comprises means for dropping and quickly arresting said containers.

14. The apparatus of claim 12 wherein said predetermined path is the arc of a circle lying in a substantially horizontal plane.

15. An apparatus for detecting the presence of solid bodies in container, comprising a vibration-sensitive detector and a plurality of grippers, means for passing said grippers through a closed path passing in proximity to said detector, means for presenting a plurality of containers to said grippers seriatim at one point in said path, means for operating said grippers to receive said containers at said point, means for vibrating the gripped containers while in immediate proximity to said detector at a second point in said closed path, in such manner that any solid bodies contained therein are caused to strike the container walls thereby setting up resultant vibrations, means for amplifying any responses of said detector to said resultant vibrations, means actuated by said amplified responses for releasing any containers holding solid bodies at a third point in said closed path and means for releasing containers free from solid bodies at a fourth point in said closed path.

ROY O. HENSZEY.
HANS BUEHLER.
PAUL SMART.